United States Patent
Inaba et al.

(10) Patent No.: US 9,492,921 B2
(45) Date of Patent: Nov. 15, 2016

(54) ROBOT CONTROLLER HAVING DETACHABLE TEACHING PENDANT

(71) Applicant: FANUC CORPORATION, Minamitsuru-gun, Yamanashi (JP)

(72) Inventors: Gou Inaba, Yamanashi (JP); Tomoyuki Yamamoto, Yamanishi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/810,964

(22) Filed: Jul. 28, 2015

(65) Prior Publication Data

US 2016/0031077 A1    Feb. 4, 2016

(30) Foreign Application Priority Data

Jul. 30, 2014  (JP) .................. 2014-154999

(51) Int. Cl.
| | |
|---|---|
| *B25J 9/00* | (2006.01) |
| *B25J 9/16* | (2006.01) |
| *G05B 19/409* | (2006.01) |
| *B25J 13/06* | (2006.01) |

(52) U.S. Cl.
CPC ............ *B25J 9/0081* (2013.01); *B25J 9/1674* (2013.01); *B25J 13/06* (2013.01); *G05B 19/409* (2013.01); *G05B 2219/36162* (2013.01); *G05B 2219/50198* (2013.01); *Y10S 901/03* (2013.01)

(58) Field of Classification Search
CPC ...... B25J 13/06; B25J 9/0081; B25J 9/1674; G05B 2219/50198; G05B 2219/39384; G05B 19/409; G05B 2219/36162; G05B 2219/23051; G05B 2219/36159; Y10S 901/03

See application file for complete search history.

(56) References Cited

U.S. PATENT DOCUMENTS

| | | | |
|---|---|---|---|
| 5,444,342 A | 8/1995 | Matsuo et al. | |
| 6,560,513 B2* | 5/2003 | Krause | B25J 9/1656 219/124.34 |
| 7,133,747 B2* | 11/2006 | Hashimoto | B25J 13/06 700/245 |
| 7,577,497 B2* | 8/2009 | Johannessen | B25J 9/1674 318/568.11 |
| 7,774,099 B2* | 8/2010 | Kobayashi | B25J 9/1671 318/560 |
| 8,175,749 B2* | 5/2012 | Tsusaka | B25J 9/1633 700/254 |
| 2002/0045970 A1* | 4/2002 | Krause | B25J 9/1656 700/264 |

(Continued)

FOREIGN PATENT DOCUMENTS

| | | |
|---|---|---|
| JP | H05-042493 A | 2/1993 |
| JP | 11000884 | 1/1999 |

(Continued)

*Primary Examiner* — Jason Holloway
(74) *Attorney, Agent, or Firm* — RatnerPrestia

(57) ABSTRACT

A robot controller for ensuring safety of an operator, which is capable of reducing operational cost by avoiding unnecessary emergency stop of a robot. A teaching pendant has an emergency stop button for interrupting drive power for the robot, and a main body of the controller has a signal part which receives an emergency stop signal from the teaching pendant when the emergency stop button is pushed, and a power interrupting part which interrupts the drive power for the robot when the signal part receives the emergency stop signal under a predetermined condition. Until a first predetermined period of time has passed after a connection/disconnection switch is operated, the power interrupting part does not interrupt the drive power when a connection-recognition signal representing that the teaching pendant is connected to the main body is not generated, even when the emergency stop signal is input from the teaching pendant.

3 Claims, 2 Drawing Sheets

(56) References Cited

U.S. PATENT DOCUMENTS

2008/0125908 A1* 5/2008 Sjoberg ................. B25J 9/1674
 700/247
2015/0239120 A1* 8/2015 Yamamoto ............. B25J 9/1602
 700/247

FOREIGN PATENT DOCUMENTS

| | | |
|---|---|---|
| JP | 2003136447 | 5/2003 |
| JP | 2004341690 | 12/2004 |
| JP | 2005118967 | 5/2005 |
| JP | 2006119995 | 5/2006 |

* cited by examiner

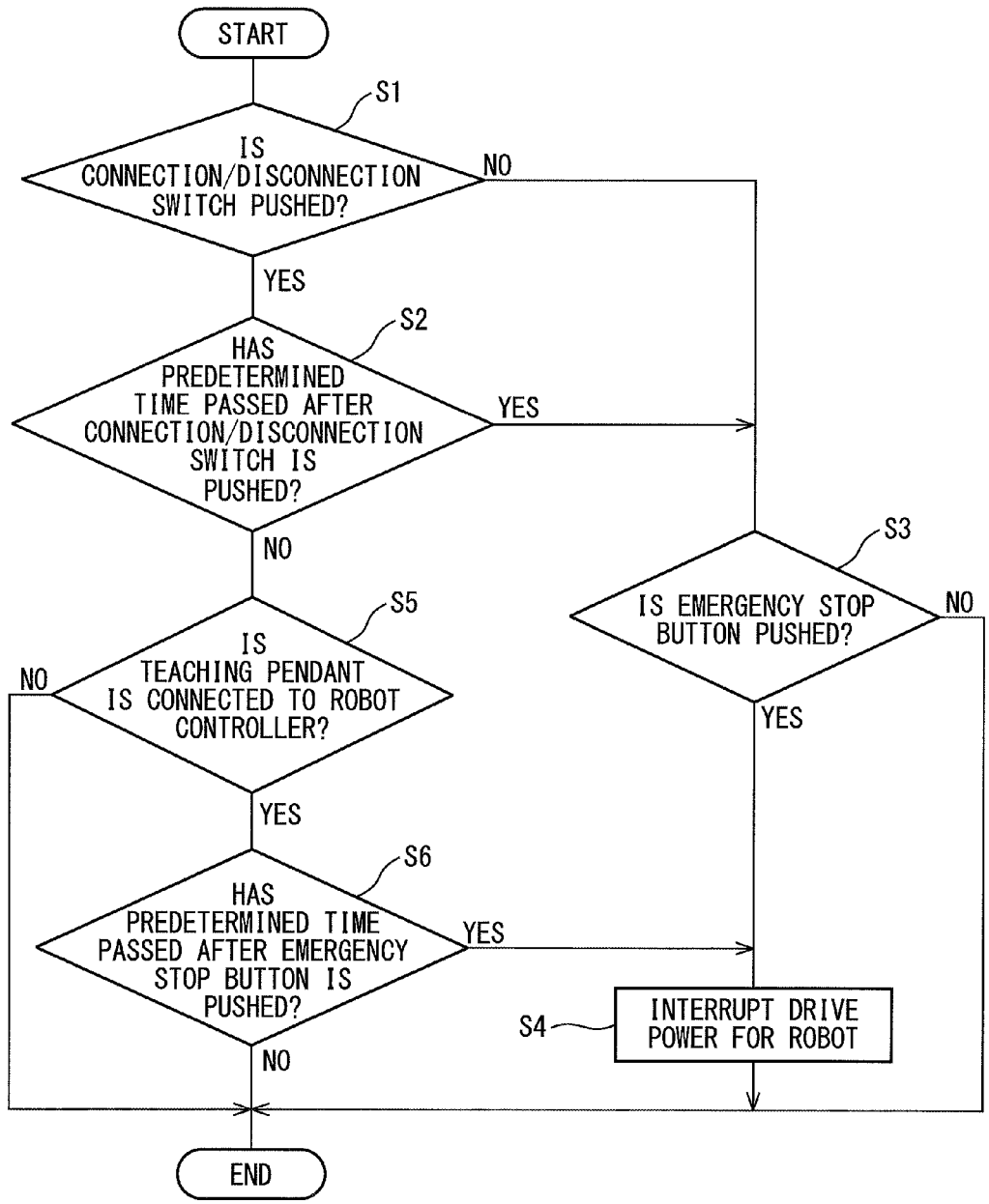

ROBOT CONTROLLER HAVING DETACHABLE TEACHING PENDANT

BACKGROUND OF THE INVENTION

1. Field of the Invention

The present invention relates to a robot controller having detachable teaching pendant.

2. Description of the Related Art

While teaching operation of a robot, a teaching pendant connected to a controller of the robot may be used. In general, the teaching pendant is used for teaching or retrieval operation of the robot, and thus is not used during automatic operation of the robot. However, in the conventional robot, since one teaching pendant is connected to one controller, the cost of a system including a plurality of robots tends increase.

On the other hand, it is a well-known technique to use a teaching pendant which is detachable from a robot controller. In this case, it is necessary to suspend the operation of the robot when the teaching pendant is attached to or detached from the controller. For example, JP H05-042493 A discloses a teaching pendant including an emergency stop circuit having a connection/disconnection switch, and a prohibiting means for prohibiting the operation of an emergency stop means when the teaching pendant is disconnected from a robot controller during the switch is pushed (or in the "ON" state).

In JP H05-042493 A, the automatic operation of the robot can be continued even when the teaching pendant is detached from the robot controller, and the emergency stop of the robot can be avoided when the robot should not be brought to an emergency stop. However, even when the connection/disconnection switch is pushed (or in the "ON" state), in some cases, the robot should be brought to the emergency stop (or a drive power for the robot should be shutoff), from the standpoint of safety of an operator. JP H05-042493 A does not disclose a practical means for appropriately dealing with such a case.

SUMMARY OF THE INVENTION

Thus, the object of the present invention is to provide a robot controller for ensuring safety of an operator, which is capable of reducing operational cost by avoiding unnecessary emergency stop of a robot.

The present invention provides a robot controller for controlling a robot, comprising: a teaching pendant having an emergency stop button for interrupting drive power for the robot, the teaching pendant being detachably connected to a main body of the robot controller; a connection/disconnection switch which is manually operated when the teaching pendant is attached to or detached from the main body of the robot controller; a signal part which generates a connection-recognition signal representing that the teaching pendant is connected to the main body of the robot controller; and a power interrupting part which interrupts drive power for the robot when the robot controller receives an emergency stop signal from the teaching pendant or when the connection-recognition signal is generated, wherein the power interrupting part is configured to not interrupt the drive power for the robot when the connection-recognition signal is not generated, during a connecting/disconnecting operation allowable state, the connecting/disconnecting operation allowable state corresponding to a duration until a first predetermined period of time has passed after the connection/disconnection switch is operated.

In a preferred embodiment, in case that the emergency stop signal is input when the connection-recognition signal is generated, during the connecting/disconnecting operation allowable state, the power interrupting part is configured to not interrupt the drive power for the robot when the connection-recognition signal is no longer generated until a second predetermined period of time has passed after the emergency stop signal is input.

In a preferred embodiment, the emergency stop signal is duplicated, and the robot controller further comprises an abnormal detecting part which detects phase mismatch in the duplicated emergency stop signal as an abnormal in the emergency stop signal, and the abnormal detecting part is configured to not detect the abnormal in the duplicated emergency stop signal during the connecting/disconnecting operation allowable state.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 2 is a flowchart showing a procedure in the robot controller of FIG. 1.

DETAILED DESCRIPTION

Figure 1:
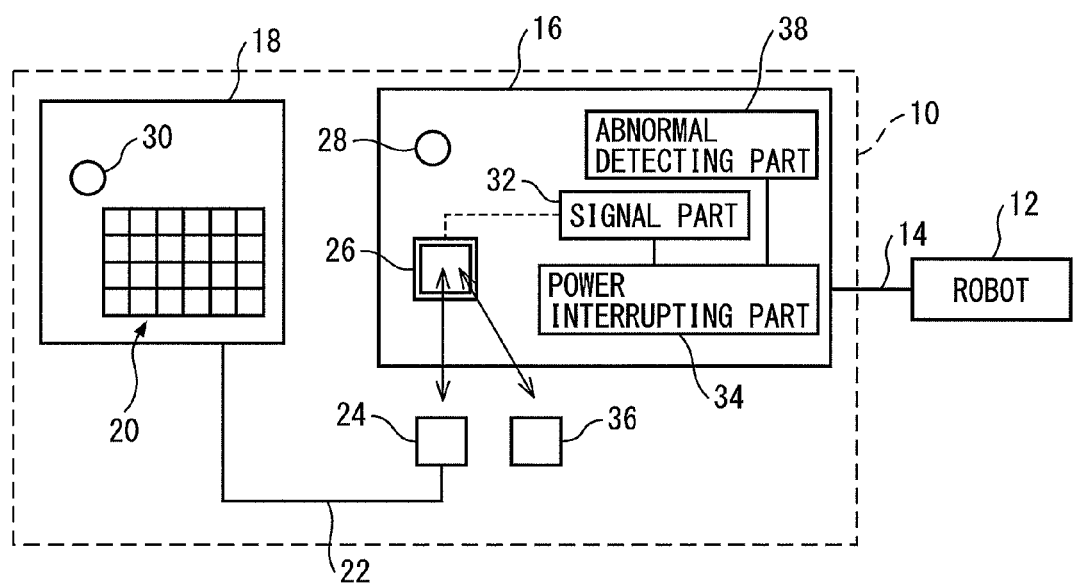
FIG. 1 is a schematic view showing a robot controller according to a preferred embodiment of the present invention, along with a robot controlled by the robot controller and a portable teaching pendant detachably connected to the robot controller.

FIG. 1 is a view schematically showing a robot controller according to a preferred embodiment of the present invention, along with a robot controlled by the robot controller and a portable teaching pendant detachably connected to the robot controller. Robot controller (hereinafter, also referred to as merely "controller") 10 is configured to control and teach the motion of a schematically shown robot 12. Robot controller has a controller main body (hereinafter, also referred to as merely "main body") 16 connected to robot 12 by radio or via a wire such as an electric cable 14, and a portable teaching pendant 18 detachably connected to main body 16. An operator may convey teaching pendant 18 within a predetermined area about main body 16, and may operates or teaches root 12 by using teaching pendant 18 (for example, by operating operation switches 20 of teaching pendant 18).

Main body 16 and teaching pendant 18 are communicably connected to each other via a cable 22. In the illustrated embodiment, a connecting plug 24 arranged on a front end of cable 22 connected to teaching pendant 18 is detachably connected to a connector 26 arranged on main body 16. Main body 16 has a connection/disconnection switch 28 which is manually operated when teaching pendant 18 is attached to or detached from main body 16. Preferably, connection/disconnection switch 28 is a momentary button.

Teaching pendant 18 has an emergency stop button 30 for interrupting the drive power for robot 12 (or bringing the robot to the emergency). On the other hand, main body 16 has a signal part (or a signal circuit) 32 which receives an emergency stop signal from teaching pendant 18 via cable 22 when emergency stop button 30 is pushed, and a power interrupting part 34 which interrupts the drive power for robot 12 when signal part 32 receives the emergency stop signal under a predetermined condition as described below.

Signal part 32 has a function for generating the emergency stop signal when teaching pendant 18 is not connected to main body 16, and a function for generating a connection-recognition signal when teaching pendant 18 is connected to main body 16. In the illustrated embodiment, connector 26 constitutes a part of signal part (or signal circuit) 32, and the emergency stop signal can be generated when connecting plug 24 or a short plug 36 is not connected to connector 26, while the connection-recognition signal can be generated when connecting plug 24 is connected to connector 26. Power interrupting part 34 interrupts the drive power for robot 12, even when signal part 32 generates the emergency stop signal, under a predetermined condition as described below.

For example, short plug 36 has the same shape as connecting plug 24, and does not have a cable. When short plug 36 is connected to connector 26, neither the emergency stop signal nor the connection-recognition signal is generated, since signal part (circuit) 32 is closed and teaching pendant 18 is not connected to connector 26.

When teaching pendant 18 is to be detached from main body 16, the operator first pushes connection/disconnection button 28. Then, before a first predetermined period of time has passed after connection/disconnection button 28 is pushed, the operator pulls out connecting plug 24 from connector 26, and inserts a connecting plug of another teaching pendant into connector 26. Until the predetermined period of time has passed after connection/disconnection button 28 is pushed, power interrupting part 34 does not interrupt or shutoff the drive power for robot 12 even when the emergency stop signal is input or generated. Therefore, teaching pendant 18 can be detached without stopping the motion of robot 12. Hereinafter, the duration or period of time, from when connection/disconnection button 28 is pushed to when the first predetermined period of time has passed, may be referred to as a "connecting/disconnecting operation allowable state."

By using short plug 36 as described above, teaching pendant 18 can be detached. In this case, the operator first pushes connection/disconnection button 28. Then, before the first predetermined time has passed after connection/disconnection button 28 is pushed, the operator pulls out connecting plug 24 from connector 26, and inserts short plug 36 into connector 26. On the other hand, when the teaching pendant is to be attached, the operator pushes connection/disconnection button 28, and then, before the first predetermined period of time has passed after connection/disconnection button 28 is pushed, the operator pulls out short plug 36 from connector 26, and inserts the connecting plug of the teaching pendant into connector 26. While short plug 36 is connected to connector 26, the emergency stop signal is not input or generated. Therefore, also in this case, the teaching pendant can be attached or detached without stopping the motion of robot 12, while the drive power for robot 12 is not interrupted until the predetermined time has passed after connection/disconnection button 28 is pushed.

Hereafter, the procedure of controller 10 will be explained with reference to a flowchart of FIG. 2. First, in step S1, it is judged as to whether or not connection/disconnection button 28 of main body 16 is in the "ON" state (or is pushed by the operator).

While connection/disconnection button 28 is pushed, in the next step S2, it is judged as to whether the first predetermined period of time has passed after connection/disconnection button 28 is pushed. The first predetermined period of time is determined based on a period of time required for attaching/detaching (or exchanging) teaching pendant 18 by the operator, for example, may be set to a value between 10 and 60 seconds. In addition, the first predetermined period of time may be set or changed by input to main body 16 or teaching pendant 18 by the operator.

When connection/disconnection button 28 is not pushed in step S1, or when the first predetermined period of time has passed after connection/disconnection button 28 is pushed (i.e., controller 10 is not in the "connecting/disconnecting operation allowable state"), it is judged as to whether or not emergency stop button 30 of teaching pendant 18 is pushed (step S3). When emergency stop button 30 is pushed, the drive power of the robot is interrupted for ensuring safety of the operator (step S4). On the other hand, when emergency stop button 30 is not pushed, a normal or routine operation is continued by using teaching pendant 18. In other words, during controller is not in the connecting/disconnecting operation allowable state, similarly to the state in which connection/disconnection button 28 is not pushed, the drive power for robot 12 is interrupted upon when emergency stop button is pushed. Therefore, even when connection/disconnection button 28 is accidentally pushed, safety of the operator can be ensured.

In step S2, when the first predetermined period of time has not passed after connection/disconnection button 28 is pushed (i.e., controller 10 is in the connecting/disconnecting operation allowable state), it is judged as to whether or not teaching pendant 18 is connected to main body 16 (i.e., whether or not the connection-recognition signal is generated), in step S5. When teaching pendant 18 is not connected to main body 16, it could be understood that the operator is working on the connecting/disconnecting operation of teaching pendant 18, and thus robot 12 is not brought to an emergency stop.

On the other hand, in step S5, when teaching pendant 18 is connected to main body 16, it is judged as to whether or not emergency stop button 30 of teaching pendant 18 is pushed over a second predetermined period of time (i.e., whether or not the second predetermined period of time has passed after emergency stop button is pushed), in the next step S6. When the second predetermined period of time has passed after emergency stop button is pushed and when teaching pendant 18 is connected to main body 16, the procedure progresses to step S4 so that the drive power for robot 12 is interrupted for ensuring safety of the operator. In other words, in case that teaching pendant 18 is to be detached while connection/disconnection button 28 is pushed, even when the emergency signal is interrupted prior to the interruption of the connection-recognition signal, teaching pendant 18 can be detached without interrupting the drive power for robot 12, as long as the connection-recognition signal is interrupted before the second predetermined period of time has passed. By virtue of this, teaching pendant 18 can be attached or detached without interrupting the drive power for robot 12, even when the timings of interruption of the emergency stop signal and the connection-recognition signal are slightly different from each other. In this regard, it is preferable that the second predetermined period of time be set to about one second.

By repeating the above procedure at an appropriate control period of time, the robot can be properly operated or taught depending on various situations.

In the above embodiment, the emergency stop signal from teaching pendant 18 may be duplicated or may be generated as a duplicated synchronizing signal. In this case, main body 16 has an abnormal detecting part 38 (FIG. 1) which judges as to whether or not the phases of the duplicated emergency signal match with each other. If there is phase mismatch in the duplicated signal, abnormal detecting part 38 detects the phase mismatch as an abnormal in the emergency stop signal. As a safety function of controller 10, when abnormal detecting part 38 detects the abnormal, power interrupting part 34 interrupts the drive power for robot 12.

However, in the attaching/detaching operation of teaching pendant 18, when the operator detaches cable 22 (or connecting plug 24) from main body 16, only one of the duplicated emergency stop signal may be temporarily opened. In such a case, it is not preferable that robot 12 be brought to an emergency stop. Therefore, in order to avoid the emergency stop of the robot in such a case, it is preferable that abnormal detecting part 38 be configured to not detect the abnormal until the first predetermined period of time has passed after connection/disconnection button 28 is pushed (i.e., during the connecting/disconnecting operation allowable state). By virtue of this, unnecessary emergency stop of the robot can be avoided when teaching pendant 18 is detached.

According to the present invention, until the first predetermined period of time has passed after the connection/disconnection button is pushed (i.e., during the connecting/disconnecting operation allowable state), the drive power for the robot is not interrupted even when the teaching pendant is not connected to the main body of the controller. Therefore, unnecessary emergency stop of the robot can be avoided, whereby the work efficiency can be improved and the operational cost can be reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller for controlling a robot, comprising:
   a teaching pendant having an emergency stop button for interrupting drive power for the robot, the teaching pendant being detachably connected to a main body of the robot controller;
   a connection/disconnection switch which is manually operated when the teaching pendant is attached to or detached from the main body of the robot controller;
   a signal part which generates a connection-recognition signal representing that the teaching pendant is connected to the main body of the robot controller; and
   a power interrupting part
   configured to not interrupt drive power for the robot when the connection-recognition signal is not generated even when the robot controller receives an emergency stop signal from the teaching pendant, during a connecting/disconnecting operation allowable state, the connecting/disconnecting operation allowable state corresponding to a duration until a first predetermined period of time has passed after the connection/disconnection switch is operated, and configured to interrupt the drive power for the robot when the robot controller receives the emergency stop signal form the teaching pendant, after the first predetermined period of time has passed.

2. The robot controller as set forth in claim 1, wherein, in case that the emergency stop signal is input when the connection-recognition signal is generated, during the connecting/disconnecting operation allowable state, the power interrupting part is configured to not interrupt the drive power for the robot when the connection-recognition signal is no longer generated until a second predetermined period of time has passed after the emergency stop signal is input.

3. The robot controller as set forth in claim 1, wherein the emergency stop signal is duplicated, and the robot controller further comprises an abnormal detecting part which detects phase mismatch in the duplicated emergency stop signal as an abnormal in the emergency stop signal, and wherein the abnormal detecting part is configured to not detect the abnormal in the duplicated emergency stop signal during the connecting/disconnecting operation allowable state.

* * * * *